US006571727B2

(12) United States Patent
Gjerde

(10) Patent No.: US 6,571,727 B2
(45) Date of Patent: Jun. 3, 2003

(54) COOKTOP INTENSITY INDICATOR DIAL

(75) Inventor: Richard Gjerde, Braceville, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/794,758

(22) Filed: Feb. 27, 2001

(65) Prior Publication Data

US 2001/0027742 A1 Oct. 11, 2001

Related U.S. Application Data

(63) Continuation-in-part of application No. 09/438,082, filed on Nov. 10, 1999, now Pat. No. 6,213,614.

(51) Int. Cl.[7] .................................................. G01D 11/28

(52) U.S. Cl. .......................... 116/284; 116/286; 362/23; 362/29

(58) Field of Search ................................ 116/309, 311, 116/315, 318, 319, 284, 286, 298, 303, 305; 362/23, 29, 28; 16/441

(56) References Cited

U.S. PATENT DOCUMENTS

| | | | | |
|---|---|---|---|---|
| 846,540 A | | 3/1907 | Wollensak | 396/449 |
| 1,037,402 A | | 9/1912 | Zehendner | 362/321 |
| 2,021,483 A | | 11/1935 | Fleming | 126/42 |
| 2,527,095 A | * | 10/1950 | Hare | 116/284 |
| 2,648,305 A | | 8/1953 | Appleman | 116/310 |
| 4,170,950 A | | 10/1979 | Ozaki | 112/444 |
| 4,408,494 A | | 10/1983 | Koblanski | 73/646 |
| 4,462,067 A | | 7/1984 | Altman | 362/268 |
| 4,947,011 A | | 8/1990 | Muranoi et al. | 200/314 |
| 5,770,052 A | | 6/1998 | Yoon | 210/94 |
| 5,803,571 A | | 9/1998 | McEntyre et al. | 362/18 |
| 5,915,822 A | | 6/1999 | Ogura et al. | 362/26 |
| 6,070,549 A | | 6/2000 | Iuchi et al. | 116/287 |
| 6,178,916 B1 | * | 1/2001 | Snider | 116/284 |
| 6,213,614 B1 | * | 4/2001 | Gjerde | 362/23 |
| 6,244,207 B1 | * | 6/2001 | Chen | 116/28.1 |

FOREIGN PATENT DOCUMENTS

GB 0611151 A1 * 10/1994

* cited by examiner

*Primary Examiner*—Diego Gutierrez
*Assistant Examiner*—Yaritza Guadalupe
(74) *Attorney, Agent, or Firm*—Pauley Petersen Kinne & Erickson

(57) ABSTRACT

An indicator dial preferably for a cooktop intensity indicator includes a base portion having an indicator, a shutter rotatably positioned with respect to the base portion, and an actuator rotatably positioned with respect to the base portion wherein at least one of the actuator and the shutter are rotatable between a retracted position exposing the indicator and an extended position at least partially covering the indicator.

15 Claims, 4 Drawing Sheets

COOKTOP INTENSITY INDICATOR DIAL

This is a Continuation-in-Part of Ser. No. 09/438,082, now U.S. Pat. No. 6,213,614, filed Nov. 10, 1999.

FIELD OF THE INVENTION

The invention relates generally to indicator dials for rotatable control devices, and more particularly to cooktop intensity indicator dials.

BACKGROUND OF THE INVENTION

Rotatable control devices are known generally and are used for example in cooking range applications to turn on and off corresponding heating units and to control the temperature intensity thereof.

U.S. Pat. No. 2,648,305 entitled "Illuminated Indicating Control" discloses a range control knob having a translucent disk coupled thereto and rotatable therewith. The disk has several segments colored differently, each of which corresponds to a particular setting of the control knob. The colored segments of the disk are individually positionable adjacent a lamp located behind the disk, and the lamp illuminates the colored segment of the disk positioned adjacent thereto depending on the rotational position of the control knob, thereby indicating the setting thereof.

SUMMARY OF THE INVENTION

The present invention is drawn toward advancements in the art of indicator dials for rotatable control devices and combinations thereof.

An object of the invention is to provide novel indicator dials for rotatable control devices and combinations thereof that overcome problems in the art.

Another object of the invention is to provide novel indicator dials for rotatable control devices and combinations thereof that are reliable and economical.

A further object of the invention is to provide novel cooktop indicator dials that indicate settings of corresponding heating unit control devices and combinations thereof.

A further object of the invention is to provide novel indicator dials having an at least partially arcuate visual indicator, and in one embodiment a light emitting indicator, that indicates variable settings of a rotatable control device associated therewith.

It is another object of the invention to provide novel indicator dials having visual indicator rings that indicate settings of rotatable control devices that rotate continuously 360 degrees in both clockwise and counter-clockwise directions.

It is yet another object of the invention to provide novel indicator dials having light emitting indicators for visually indicating settings of rotatable control devices and for illuminating graphics associated therewith.

A more particular object of the invention is to provide novel indicator dials comprising generally a plurality of shutters disposed on a base portion and movable between radially retracted and extended positions, a cover portion having a cam groove disposed on a side thereof adjacent the plurality of shutters, a cam follower disposed on each of the shutters and protruding into the cam groove of the cover portion, whereby the cover portion is rotatable relative to the base portion to move the shutters between the retracted and extended positions.

Another more particular object of the invention is to provide novel indicator dials comprising generally a plurality of shutters disposed on a base portion and movable between radially retracted and extended positions, an at least partially arcuate indicator disposed on the base portion and located radially outwardly of the shutters when the shutters are in the retracted position, whereby each of the shutters covers a corresponding portion of the indicator when the shutters are in the extended position.

Yet another more particular object of the invention is to provide novel indicator dials comprising generally a plurality of shutters disposed on a base portion and movable between radially retracted and extended positions, an at least partially arcuate light emitting ring disposed on the base portion and located radially outwardly of the shutters when the shutters are in the retracted position, a cover portion having a cam groove disposed on a side thereof adjacent the plurality of shutters, a portion of the shutters protruding into the cam groove of the cover portion, the cover portion rotatable relative to the base portion to move the shutters between the retracted and extended positions, whereby the shutters cover corresponding portions of the light emitting ring when the shutters are extended.

Yet another particular object of the invention is to provide a novel indicator dial comprising a base portion, a shutter moveably positioned with respect to the base portion, and an actuator moveably positioned with respect to the shutter wherein the actuator and the shutter are moveable between a retracted position and an extended position.

These and other objects, aspects, features and advantages of the present invention will become more fully apparent upon careful consideration of the following Description of the Preferred Embodiments and the accompanying Drawings, which may be disproportionate for ease of understanding, wherein like structure and steps are referenced generally by corresponding numerals and indicators.

DESCRIPTION OF THE PREFERRED EMBODIMENTS

Figure 1:
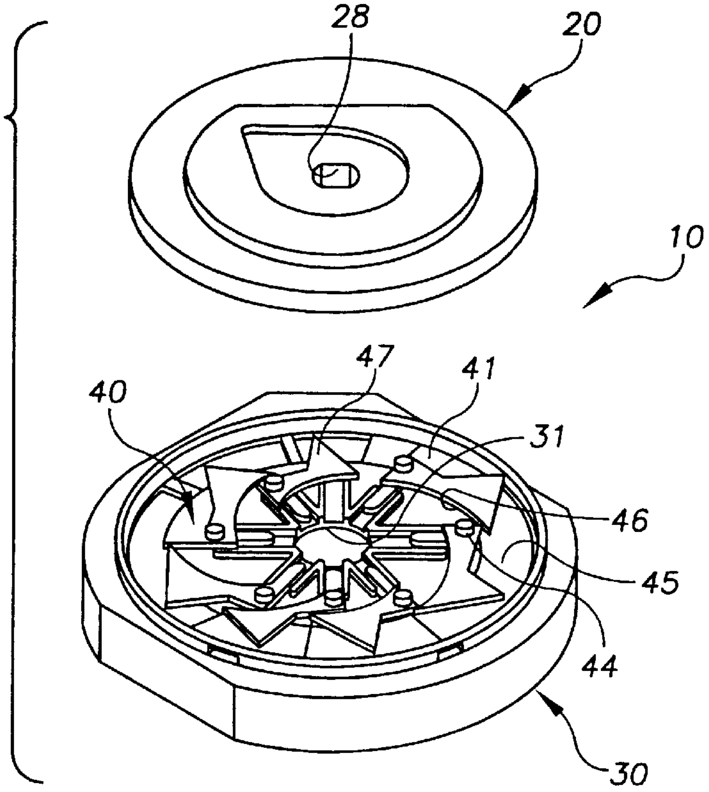
FIG. 1 is a disassembled perspective view of an exemplary indicator dial.

FIG. 1 illustrates an indicator dial 10 comprising generally a base portion 30 and a cover portion 20 rotatable relative thereto. The base portion comprises generally a plurality of shutters 40 movable between radially retracted and extended positions upon rotation of the cover portion relative thereto to provide setting indications, as discussed below.

The cover portion comprises a cam groove disposed on a side thereof adjacent the plurality of shutters, and the plurality of shutters include a cam follower that protrudes into the cam groove of the cover. When the cover is rotated relative to the base, the cam followers cooperate with the cam groove to selectively move the shutters between retracted and extended positions, thereby varying an indicator portion of the dial as discussed below.

Figure 2:
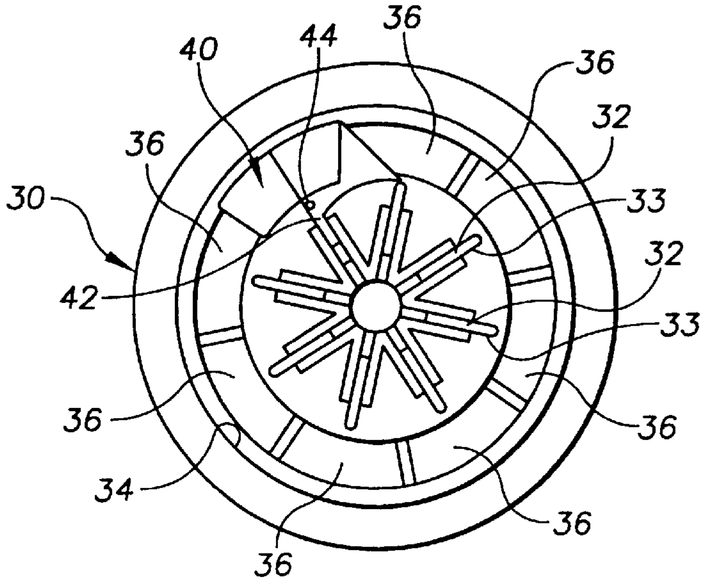
FIG. 2 is a plan view of a base portion of an exemplary indicator dial having a single shutter in an extended position.
Figure 3A:
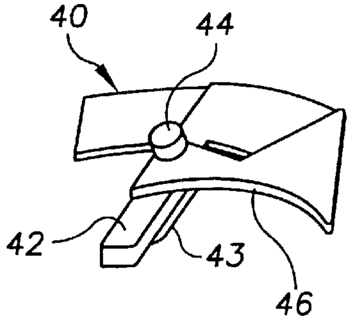
FIG. 3*a* is a perspective upper side view of an exemplary shutter.
Figure 3B:
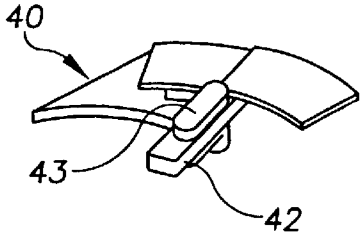
FIG. 3*b* is a perspective lower side view of an exemplary shutter.

In the exemplary embodiment of FIG. 2, the base portion 30 comprises a plurality of slots 32, only some of which are identified with reference numerals, disposed generally radially on a side thereof. In FIGS. 2, 3*a* and 3*b*, the shutters 40 each include a guide rail 42 that is disposable in a corresponding slot of the base portion, as illustrated in FIGS. 1 and 2. The slots 32 thus guide the shutters 40 as the shutters radially reciprocate between the retracted and extended positions under the influence of the rotating cover portion.

In FIG. 2, the slots 32 of the base portion 30 each include a recess 33 disposed therein, and in FIG. 3*b* the guide rails 42 of the shutters 40 each include a further protrusion 43 thereon. The protrusion 43 is disposed in a corresponding recess 33 of the base portion when the guide rail 42 is disposed in the corresponding slot 32 thereof. The recesses limit the extent that the shutters are retracted and extended. In other embodiments, the recesses are not required, and the radial movement of the shutters is limited by other structure, for example by the cam groove of the cover portion discussed further below or by an outer circumferential portion 34 of the base 30.

In the exemplary embodiments of FIGS. 1, 2 and 3*a*, the cam follower of the shutter 40 is in the form of a pin 44 protruding therefrom. The shutter pins are disposable into the cam groove when the cover portion is positioned adjacent the shutters, and the pins are movable along the cam groove as the cover is rotated relative to the base thereby moving the shutters between the retracted and extended positions.

Figure 4:
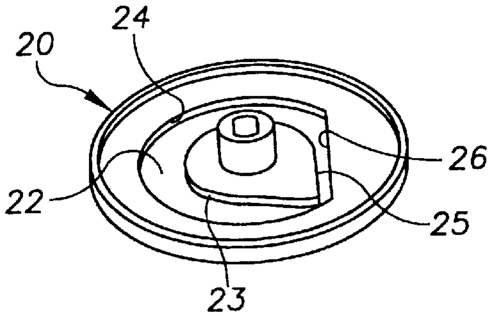
FIG. 4 is a perspective view of a cover portion having a cam groove.

In the exemplary embodiment of FIGS. 1 and 4, the cam groove 22 is a closed-ended loop, which permits continuous 360 degree rotation of the cover portion in both the clockwise and counter-clockwise directions relative to the base portion. In other alternative embodiments however the cam groove may be open ended, thereby limiting the rotational displacement of the cover portion so that it pivots back and forth over a limited angular range of motion that is 360 degrees or less.

In FIG. 4, the exemplary cam groove 22 is disposed between inner and outer walls and formed on a side of the cover portion facing the shutters. The cam groove and more particularly portions of the inner and outer walls thereof engage the cam followers of the shutters to move the shutters radially between the retracted and extended positions as the cover is rotated relative to the base. The position of the shutters is thus dependent on the configuration of the cam groove, which controls the indicator dial configuration.

The exemplary inner wall has a first inner wall portion 23, which is curved, and a second inner wall portion 25, which is relatively straight. The exemplary outer wall has a first outer wall portion 24, which is also curved, and a second outer wall portion 26, which is also relatively straight. Alternatively, the second inner and outer wall portions 25 and 26 may also be curved.

Portions of the inner and outer first wall portions 23 and 24 are adjacent each other, and are spaced apart to accommodate the shutters in either the retracted and extended positions without radial movement thereof. In other words, a portion of the cam groove between the inner and outer first wall portions does not influence the position of the shutters as the cover portion 20 is rotated relative to the base 30.

The second inner and outer wall portions 25 and 26 are also adjacent each other but are spaced comparatively closer together than the first inner and outer wall portions 23 and 24 so that portions of the second inner and outer wall portions 25 and 26 move the shutters between the extended and retracted positions upon rotation of the cover. In other embodiments, the cam groove may be configured differently.

In FIG. 2, a visual indicator is disposed on the base portion 30 in the form of an indicator ring formed by a plurality of discrete indicator portions 36. In an alternative embodiment, the indicator ring is a continuous ring. In another alternative embodiment, the indicator is arranged in an open-ended indicator arc, which may be formed continuously or of discrete portions. The indicator ring or arc is disposed radially outwardly of the shutters when the shutters are in the retracted position. However, when the shutters are moved to the extended position, corresponding portions of the indicator ring or arc are covered or obstructed by the shutters, as illustrated by the single extended shutter 40 in FIG. 2.

The shutters and the indicator ring or arc have contrasting visual characteristics, for example different colors or reflectivity or absorption or emission properties, so that the extent to which the indicator ring or arc is visible varies depending on the extent to which it is covered by the shutters. The setting of the dial is thus related to the proportion of the indicator ring or arc covered or not covered by the shutters.

In the exemplary embodiment, the cover portion 20 is disposed over the indicator portions 36 of the base and is formed of a transparent or translucent material so that the indicator portion is visible through the cover. In other embodiments, only the outer circumferential portion of the cover that covers the visual indicator is transparent or translucent. In still other embodiments, the diameter of the cover portion is reduced so that it does not cover the visual indicator portion of the base.

In the exemplary embodiment, the indicator ring and more particularly the discrete indicator portions 36 thereof are formed by a corresponding plurality of discrete apertures through the base portion. The apertures, and in some embodiments a single aperture, emit light produced by a light source disposed on or behind the base portion, thus forming a ring or arc of light visible from the cover side of the dial. In operation, portions of the light ring or arc are covered by shutters moved to the extended position, which corresponds to some variable parameter setting associated therewith.

In one embodiment, the cam groove has a first cam portion engagable with the cam followers of the plurality of shutters in the retracted position when the cover portion is rotated in a first direction relative to the base portion to sequentially move the shutters from the retracted position to the extended position. The cam groove also has a second cam portion engageable with the cam followers of the plurality shutters in the extended position when the cover portion is rotated in a second direction opposite the first direction relative to the base portion. In the exemplary embodiment of FIG. 4, the first cam portion corresponds to the inner wall portion 25, and the second cam portion corresponds to the outer wall portion 26.

Figure 5A:
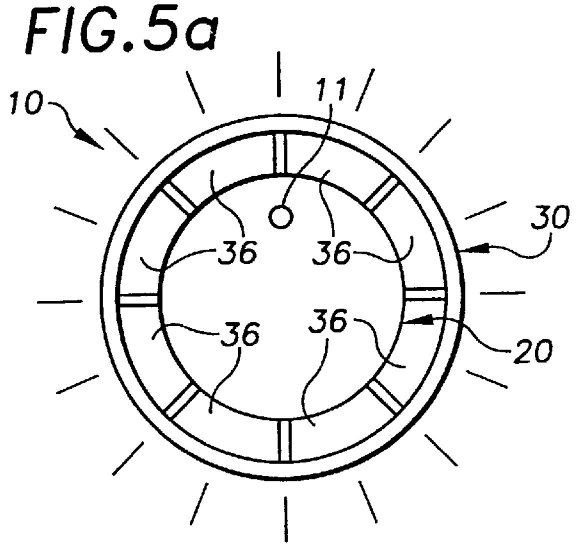
FIG. 5*a* is a control knob in a first position and a corresponding first indicator dial configuration.

FIG. 5*a* illustrates more particularly the cover portion 20, which may include a control knob, oriented so that a reference marker 11 associated therewith is in a home or reference position, arbitrarily selected to be in the zenith position in FIG. 5*a*. In the exemplary embodiment, when the marker 11 of the cover portion 20 is in the home position, all of the shutters are in the retracted position, whereby the visual indicator ring formed by the discrete portions 36 is entirely visible, as illustrated in FIG. 5*a*.

Figure 5B:
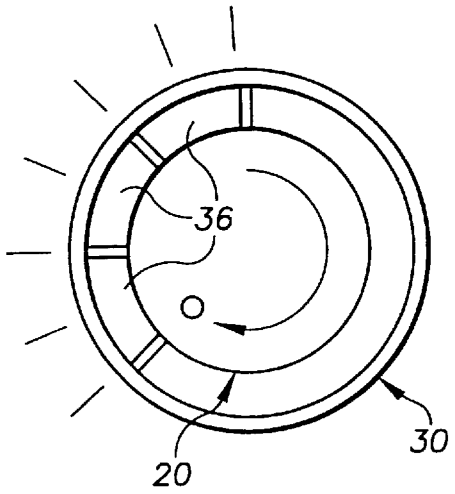
FIG. 5*b* is a control knob in a second position and a corresponding second indicator dial configuration.

In FIG. 5*b*, upon rotation of the cover portion 20 in the first clockwise direction, the shutters are sequentially moved from the retracted position to the extended position to cover corresponding portions of the indicator ring. Continued rotation of the cover portion 20 in the clockwise direction a full 360 degrees will result in all of the shutters being sequentially moved from the retracted position to the extended position thereby covering all portions of the indicator ring, as illustrated in FIG. 5*c*.

Figure 5C:
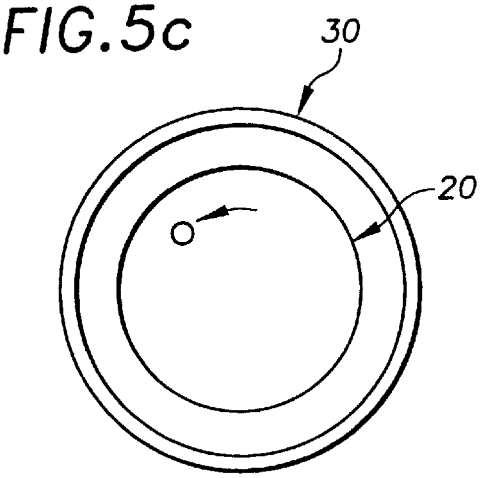
FIG. 5*c* is a control knob in a third position and a corresponding third indicator dial configuration.
Figure 5D:
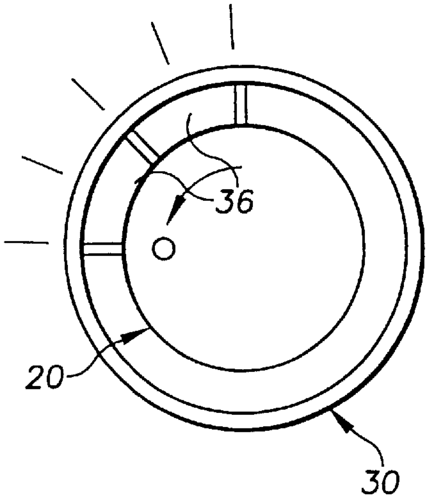
FIG. 5*d* is a control knob in a fourth position and a corresponding fourth indicator dial configuration.

In FIG. 5*d*, upon rotation of the cover portion 20 in the second counter-clockwise direction, the shutters are sequentially moved from the extended position back to the retracted position in reverse order.

In FIG. 3*a*, the shutters 40 include a follower engagement portion 46 thereon. In FIG. 1, at least some of the follower engagement portions 46 of the shutters extend radially outwardly of and are engagable with a portion of an adjacent shutter, which in the exemplary embodiment is the cam follower 44 thereof In FIG. 1, the shutter 41 has a follower engagement portion 46 that is engaged with an adjacent shutter 45 on one side thereof, but the shutter 41 is not influenced by the adjacent shutter 47 on the other side thereof. This configuration permits sequential movement of the shutters without influencing all of the other shutters, as discussed above.

When the cover portion 20 is rotated from the home position in FIG. 5*a* in the second counter-clockwise direction, all of the shutters are initially moved simultaneously from the retracted position in FIG. 5*a* to the extended position in FIG. 5*c* by virtue of the cooperation of the follower engagement portions 46 and the cam followers 44, discussed above and illustrated best in FIG. 1. In FIG. 5*c*, the shutters cover all portions of the indicator ring.

Subsequent and continued rotation of the cover portion 20 in the counter-clockwise direction will result in the shutters being sequentially moved from the extended position to the retracted position until the cover portion 20 is returned to the home position, whereupon all of the shutters will have been retracted, as illustrated in FIG. 5*a*.

Figure 6:
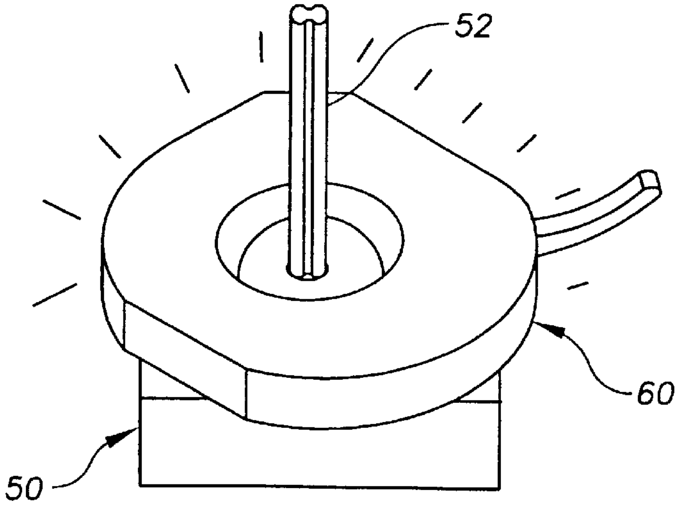
FIG. 6 is a rotatable control device having an illuminating device mounted thereon for use in combination with the indicator dial of the present invention.

In FIG. 1, the indicator dial 10 is usable in combination with a control device 50 of the type having a rotatable shaft 52, as illustrated in FIG. 6. The rotation of the shaft 52 of the control device 50 generally controls some adjustable parameter associated therewith, for example the variable resistance of a potentiometer or fluid flow. In one exemplary application, the control device controls a corresponding heating unit on an electric or gas range. The indicator dial 10 of the present invention may be used alternatively in any application where there is a desire to indicate the setting of a rotatable control device or shaft.

In the exemplary application, the base portion 30 is generally mounted and thus rotationally fixed. The base portion 30 is fastened more particularly to the control device 50, whereupon the shaft 52 thereof is rotatably disposed through an aperture 31 of the base.

The cover portion 20 is generally coupled to the rotatable shaft 52 and thus rotatable therewith. In FIG. 1, the cover portion has a keyed aperture 28 through which the keyed shaft 52 is disposed and thereby coupled to the cover portion, whereupon the cover is positioned adjacent the base portion so that the cam followers 44 protrude into the cam groove 22. The cover portion 20 may include a control knob formed therewith for gripping, or a separate control knob may be coupled to the shaft 52.

In FIG. 6, a light source 60 is disposed generally adjacent to the base portion 30 that light emitted therefrom is directed through the one or more apertures of the base portion and made visible from the cover side of the indicator dial. The light source thus produces a light ring about the rotatable shaft, whereby portions of the light ring may be obstructed by the shutters to indicate the setting of the control device dependent on the angular position of the rotatable shaft and the cover portion coupled thereto, as discussed above. In some applications, the light source may also illuminate various graphics around the control knob.

FIG. 6 illustrates the light source 60 in the form of a light emitting fixture fastened to the control device 50, wherein the base portion 30 of the indicator dial 10 is mountable on the light source 60. Light emitting fixtures suitable for this application are available commercially from ITW Jemco, Minooka, Ill.

Figure 8:
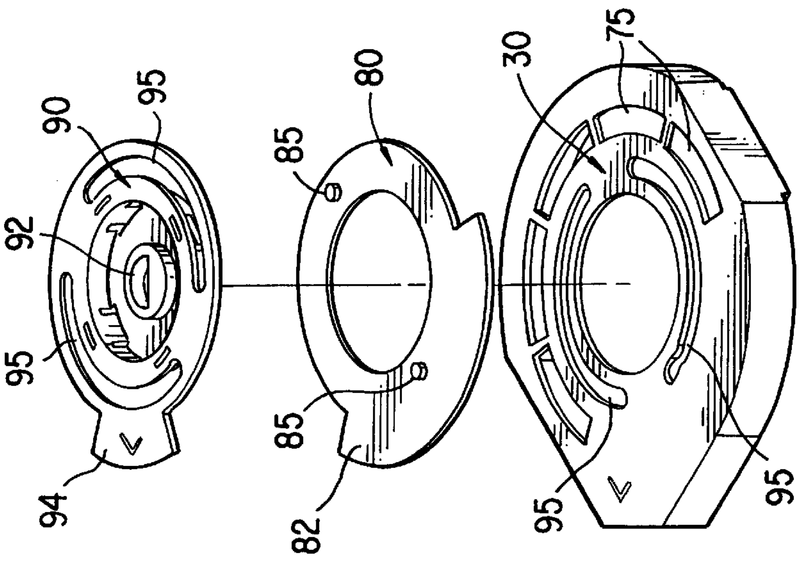
FIG. 8 is a disassembled perspective view of an exemplary indicator dial.
Figure 7:
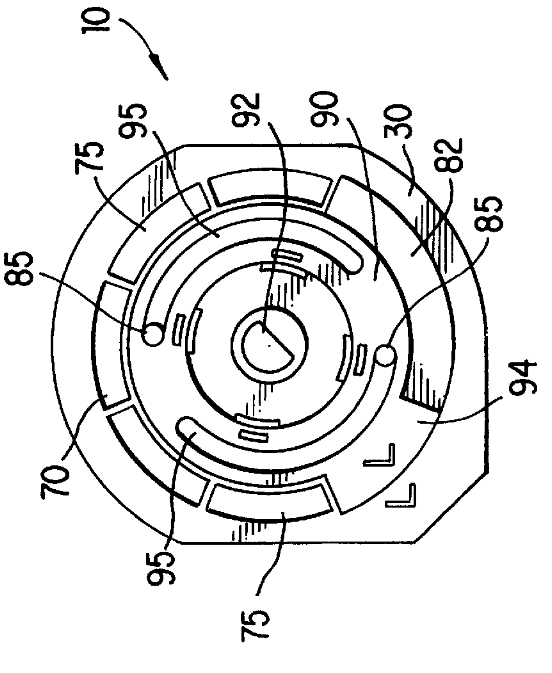
FIG. 7 is a top view of a control knob.

According to another preferred embodiment of this invention shown in FIGS. 7 and 8, the indicator dial 10 includes the base portion 30, a shutter 80 moveably positioned with respect to the base portion 30 and may further include an actuator 90 moveably positioned with respect to the shutter 80. As shown in more detail in FIG. 8, the actuator 90 and the shutter 80 are preferably rotatably connected with respect to the base portion 30. According to this preferred embodiment of the invention, the actuator 90 and/or the shutter 80 are moveable between a retracted position that uncovers at least a portion of the base portion 30 and an extended position that covers at least a portion of the base portion 30.

In addition, the indicator dial 10 may further include an indicator 70 positioned with respect to the base portion 30. As described in more detail above, the indicator 70 may be illuminated or include an alternative means for providing an indication of a particular characteristic, such as a heat intensity of a burner. As shown in FIGS. 7 and 8, the indicator 70 may be formed in an arcuate path. Additionally, the arcuate path of the indicator 70 may be formed in discrete arc segments 75, each arc segment indicating an incremental increase/decrease in heat intensity or similar characteristic.

According to a preferred embodiment of this invention, at least one projection 85 is positioned on a face of the shutter 80. As shown in FIG. 8, the shutter 80 may include two projections 85 on a top face and an additional two projections 85 (not shown) on a bottom face. Accordingly, at least one corresponding groove 95 is positioned within the base 30 and/or the actuator 90. The corresponding groove 95 preferably receives at least one projection 85, through which the projection 85 travels along a preferably arcuate path. As a result of such a preferred arrangement, the shutter 80 travels in a predictable arcuate path around the base portion 30. Similarly, the actuator 90 may travel in an arcuate path with respect to the shutter 80 and therefore necessarily with respect to the base portion 30.

In operation, the indicator dial 10 according to this preferred embodiment of the invention permits the shutter 80 to cover at least a portion of the indicator 70 as the shutter 80 is rotated relative to the base portion 30. Likewise, the actuator 90 may also cover at least a portion of the indicator 70 as the actuator 90 is rotated relative to the base portion 30. According to one preferred embodiment of this invention, in an extended position, the shutter 80 covers a first portion of the indicator 70 and the actuator 90 covers a second portion of the indicator 70. Preferably, the indicator 70 is covered in increments corresponding with the arc segments 75 in the base portion 30.

More particularly, and as shown in FIGS. 7 and 8, a shutter flap 82 and/or an actuator flap 94 cover the indicator 70 as the shutter 80 and/or the actuator 90 are rotated relative to the base portion 30. As a result of the particular arrangement shown in FIGS. 7 and 8, as the indicator dial 10 is positioned in the extended position, the actuator 90 rotates on top of the shutter 80 and the actuator flap 94 covers a portion of the indicator 70. The actuator 90 is rotated until the projection 85 contacts an end of the respective groove 95 at which point the shutter 80 begins to rotate to so that the shutter flap 82 covers an additional portion of the indicator 70. Preferably, each of the shutter 80 and/or the actuator 90, separately or in combination, may be rotated to cover predetermined segments of the indicator 70, such as arc segments 75.

As described in more detail above, the indicator dial 10 according to a preferred embodiment of this invention further comprises a keyed portion 92 for passage of a knob (not shown) for adjusting the actuator 90 and the shutter 80 between the retracted position and the extended position.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

I claim:

1. An indicator dial comprising:

a base portion having an indicator fanned in an arcuate path;

a shutter rotatably positioned with respect to the base portion around an arcuate path corresponding with the arcuate path of the indicator; and an acutator moveably positioned with respect to the shutter wherein the actuator and the shutter are moveable relative to the base portion between a retracted position and an extended position of the indicator dial, wherein in the extended position, the shutter and the actuator each cover a portion of the indicator.

2. The indicator dial of claim 1 further comprising:

at least one projection positioned on a face of the shutter; and at least one groove positioned within at least one of the base and the actuator and receiving the at least one projection.

3. The indicator dial of claim 1 wherein, in the extended position, the shutter covers a first portion of the indicator and the actuator covers a second portion of the indicator.

4. The indicator dial of claim 1 wherein the actuator further comprises a keyed portion for passage of a knob for adjusting the actuator and the shutter between the retracted position and the extended position.

5. An indicator dial comprising:

a base portion having an indicator wherein the indicator is formed in an arcuate path having a plurality of discrete arc segments;

a shutter rotatably positioned with respect to the base portion; and an actuator rotatably positioned with respect to the base portion wherein the actuator and the shutter are rotatable between a retracted position of the indicator dial exposing the indicator and an extended position of the indicator dial wherein the actuator and the shutter at least partially cover the indicator.

6. The indicator dial of claim 5 further comprising:

at least one projection positioned on a face of the shutter; and at least one arcuate groove positioned within at least one of the base and the actuator and receiving the at least one projection.

7. The indicator dial of claim 5 wherein the shutter is generally planar and sandwiched between the actuator and the base portion.

8. An indicator dial comprising:

a base portion having an indicator;

a shutter rotatably positioned with respect to the base portion; and an actuator rotatably positioned with respect to the base portion wherein at least one of the actuator and the shutter are rotatable between a retracted position of the indicator dial exposing the indicator and an extended position of the indicator dial at least partially covering the indicator, wherein, in an extended position, the shutter covers a first portion of the indicator and the actuator covers a second portion of the indicator.

9. An indicator dial comprising:

a base portion having an indicator formed in an arcuate path;

a shutter rotatably positioned over the base portion, the shutter rotatable between a retracted position of the indicator dial exposing the arcuate path of the indicator and an extended position of the indicator dial at least partially covering the arcuate path of the indicator; and an actuator rotatably positioned over the shutter and rotatable between the retracted position and the extended position.

10. The indicator dial of claim 9 wherein the indicator is illuminated.

11. The indicator dial of claim 9 further comprising:

at least one projection positioned on a face of the shutter; and at least one arcuate groove positioned within the base and receiving the at least one projection.

12. The indicator dial of claim 9 further comprising:

at least one projection positioned on the shutter; and at least one groove positioned within at least one of the base portion and the actuator and receiving the at least one projection.

13. The indicator dial of claim 9 wherein, in an extended position, the shutter covers a first portion of the arcuate path and the actuator covers a second portion of the arcuate path.

14. An indicator dial comprising:

a base portion;

an indicator positioned with respect to the base portion, the indicator formed in an arcuate path;

a shutter moveably positioned with respect to the base portion; and an actuator moveably positioned with respect to the shutter wherein the actuator and the shutter are moveable between a retracted position and an extended position of the indicator dial, wherein, in an extended position, the shutter covers a first portion of the indicator and the actuator covers a second portion of the indicator.

15. An indicator dial comprising:

a base portion having an indicator;

a shutter moveably positioned with respect to the base portion; and an actuator rotatably positioned with respect to the shutter and the base portion wherein the actuator and the shutter are moveable between a retracted position and an extended position of the indicator dial, wherein the shutter covers a first portion of the base in the extended position and the actuator covers a second portion of the base the extended position.

* * * * *